United States Patent [19]

Kenny et al.

[11] Patent Number: 4,616,164
[45] Date of Patent: Oct. 7, 1986

[54] FEEDBACK SERVO ACTUATOR

[75] Inventors: Andrew A. Kenny, Roselle; Daniel C. Stahly, Elmhurst; Dennis DeVera, Bloomingdale, all of Ill.

[73] Assignee: Eaton Corporation, Cleveland, Ohio

[21] Appl. No.: 751,996

[22] Filed: Jul. 3, 1985

Related U.S. Application Data

[63] Continuation-in-part of Ser. No. 594,080, Mar. 28, 1984.

[51] Int. Cl.⁴ .......................... G05B 1/06; H02K 7/10
[52] U.S. Cl. ...................................... 318/666; 318/15; 338/184; 338/199; 74/DIG. 10
[58] Field of Search ...................... 318/663, 12, 666, 9, 318/15, 667, 668, 670, 671, 664, 665; 338/164, 184, 199; 74/DIG. 10, 412 R, 416, 413, 414

[56] References Cited

U.S. PATENT DOCUMENTS

| | | | |
|---|---|---|---|
| 4,105,987 | 8/1978 | Spence | 338/184 X |
| 4,311,946 | 1/1982 | Pathmann | 318/663 |
| 4,433,964 | 2/1984 | Holtzberg | 74/DIG. 10 X |
| 4,463,831 | 8/1984 | Wakase | 74/DIG. 10 X |

OTHER PUBLICATIONS

Wheeler, William, "Precision Position Sensors in Automatic Applications", 0148-7191/78/0277-0209, 1978 Soc. of Auto. Engr., Inc., (10 pp.).

Primary Examiner—William M. Shoop, Jr.
Assistant Examiner—Patrick C. Keane
Attorney, Agent, or Firm—C. H. Grace; R. A. Johnston

[57] ABSTRACT

A feedback potentiometer type servoactuator having a plastic housing shell with small high RPM low voltage motor and non-metallic gear reduction train for driving an output shaft. The shell and cover plate provide structural support for gear journalling and the cover plate has an electrically resistive plastic strip baked onto the inside of the cover. Contacts mounted on the output gear for movement therewith wipe the resistive strip to provide variable resistance for an output shaft position feedback signal. The motor pinion and first stage reduction gears are made of urethane thermoplastic elastomer, the second stage gears of acetal plastic and the final gears are formed of 30% glass fiber filled polyester plastic for providing quiet running and long gear life.

18 Claims, 3 Drawing Figures

FEEDBACK SERVO ACTUATOR

This application is a continuation-in-part of application Ser. No. 594,080, filed 3/28/84.

BACKGROUND OF THE INVENTION

The present invention relates to electromechanical devices for turning an output shaft to a desired rotational position in response to an electrical position signal input to the device. Devices of this type are known to employ a direct current motor driving a gear train to provide a desired torque with speed reduction of the rate of rotation output shaft as it is rotated to the desired position. In such an arrangement, it is known to provide a feedback potentiometer which is connected to be rotated by the output shaft to vary the resistance in a circuit. The variable resistance may be used to balance a Wheatstone bridge circuit, and thus null the output of the bridge circuit, when the desired potentiometer resistance is obtained by rotation of the output shaft. Typically, in known feedback type servoactuators, the Wheatstone bridge is unbalanced by an amount of an electrical resistance representative of a predetermined desired position of the output shaft. The motor is then energized and the output shaft rotated until the feedback resistor balances the Wheatstone bridge circuit: the nulled output of the bridge circuit is utilized to de-energize the motor thereby stopping rotation of the output shaft at the desired position. It is also known to use a comparator for detecting a predetermined voltage from the potentiometer and utilizing the comparator to output to effect breaking of the motor drive circuit.

Feedback servoactuators are employed in numerous applications where it is desired to rotate a shaft to a desired position in response to an electrical command position signal. One such application of a feedback servoactuator is that employed in automotive passenger compartment heating and cooling systems where the position of the air blend door, or vane, is electrically controlled for apportioning the flow of heated and cooled air in the discharge ducting.

Heretofore, feedback servoactuators employed for automotive blend door positioning have utilized separate wire wound or carbon resistive potentiometers for varying the feedback resistance in response to rotation of the output shaft. This has necessitated a geared or separate drive coupling of the output shaft to the moveable wiper of the potentiometer. Separate couplings from the output shaft to the potentiometer wiper have proved to be costly and cumbersome in manufacturing. Known potentiometer coupling arrangements have introduced a source lost motion between the output shaft and the potentiometer wiper in the coupling and have thus caused error in the shaft positin feedback signal.

Furthermore, servoactuators of the aforesaid type for automative air temperature control systems generally utilize a lower power small fractional horsepower motor having a high motor shaft speed and a speed reducer for providing fractional RPM and relatively high torque at the output shaft for the desired output function. Where low torque drive motors having high shaft speeds are employed, with substantial speed reduction, it has been found quite difficult to provide such a servoactuator that was not prohibitively costly. The costliners has been due in part to the need for metal gears to provide the substantial speed reduction and yet provide sufficiently quiet running to be acceptable for automotive passenger compartment heating and cooling system service.

In providing servoactuators for automotive passenger car service, as described above, it has long been desired to find a way of providing a servo for which the motor could be electrically supplied power directly by solid state switching devices, such as FETs with low current draw at low voltages of the order of 12–14 volts supplied by the on-board vehicle battery/alternator system. In order for the solid state switching devices to provide the motor command signals directly, the motor must necessarily be of very low wattage power consumption. In order to develop the required servo output torque and slow rate of rotation for automotive applications, it has been found necessary to utilize a small very high shaft RPM motor with a multiple stage speed reducer to provide the desired output torque. In providing such a high RPM motor input, speed reduction and high torque precision position seeking output, it has been found difficult to provide the quiet running capability required for automotive passenger compartment service application.

Thus, it has long been desired to find a way or means of providing a reliable consistant potentiometer feedback signal in a position seeking servoactuator which is simple in construction without employing separate couplings between the output shaft and the potentiometer which have been found to be a source of error in the position feedback signal. It has also long been desired to provide an output rotary position-seeking servoactuator which is low in manufacturing cost and utilized a motor capable of direct control by low voltage solid state switching and yet provides quick response and is quiet running.

SUMMARY OF THE INVENTION

The present invention provides an electrical position seeking servoactuator which gives precision positioning of an output shaft in a compact, simple, low cost, quiet running assembly. The servoactuator of the present invention employs a two-piece plastic case having a hollow walled portion which has mounted therein the motor and gear train with a sector gear for rotating the output shaft. Output position feedback is provided integrally by electrically conductive wiper arms attached to the sector gear for movement therewith. The moveable wiper arms make contact with stationary arcuately-shaped electrically conductive strips provided integrally on the inner surface of the housing cover plate. One of the conductive strips comprises polymeric material mixed with an electrically resistive material which is baked on the inner surface of the cover plate thereby forming a variable resistor with one of the wiper contacts. The variable resistor comprises the feedback potentiometer for the servoactuator.

The servoactuator is driven by a fractional horsepower D.C. motor having minimal current requirements at 12 volts D.C. for onboard automotive applications.

The small subfractional horsepower drive motor has a relatively high shaft rotation speed. The high motor shaft speed is reduced through a non-metallic gear train, preferably having three clusters, or stages, by an overall ratio on the order of one to eight hundred forty five (1/845). The input stage is formed of relatively soft low modulus thermoplastic urethane elastomer, the intermediate state or cluster is formed of thermoplastic acetal resin material having a higher modulus and surface hardness than the input gear cluster; and, the output stage or cluster is formed of high strength glass reinforced polyester plastic material having low coefficient of friction and greater wear resistance than the prior clusters in the train. The gears are preferably lubricated with a synthetic grease for greater wear life and further reduction of running noise.

The present servoactuator is ideally suited for having the output shaft adapted for connection to drive the airblend vane, or door, in on-board automotive temperature control systems for controlling the temperature of blower discharge air to the vehicle passenger compartment. The servoactuator of the present invention thus provides a unique construction which has the potentiometer resistor integrally formed with the cover plate for the servoactuator housing with the wiper attached directly to the output gear and thus gives precision positioning of the output shaft.

The servoactuator of the present invention provides low power consumption for 12 volt on-board vehicle operation and provides quick response, precision output shaft positioning and quiet running. The present servoactuator employs non-metallic gearing for speed reduction and is low in manufacturing cost and has been found particularly suitable for controlling passenger compartment air temperature in high volume passenger car production applications.

DETAILED DESCRIPTION

Figure 1:
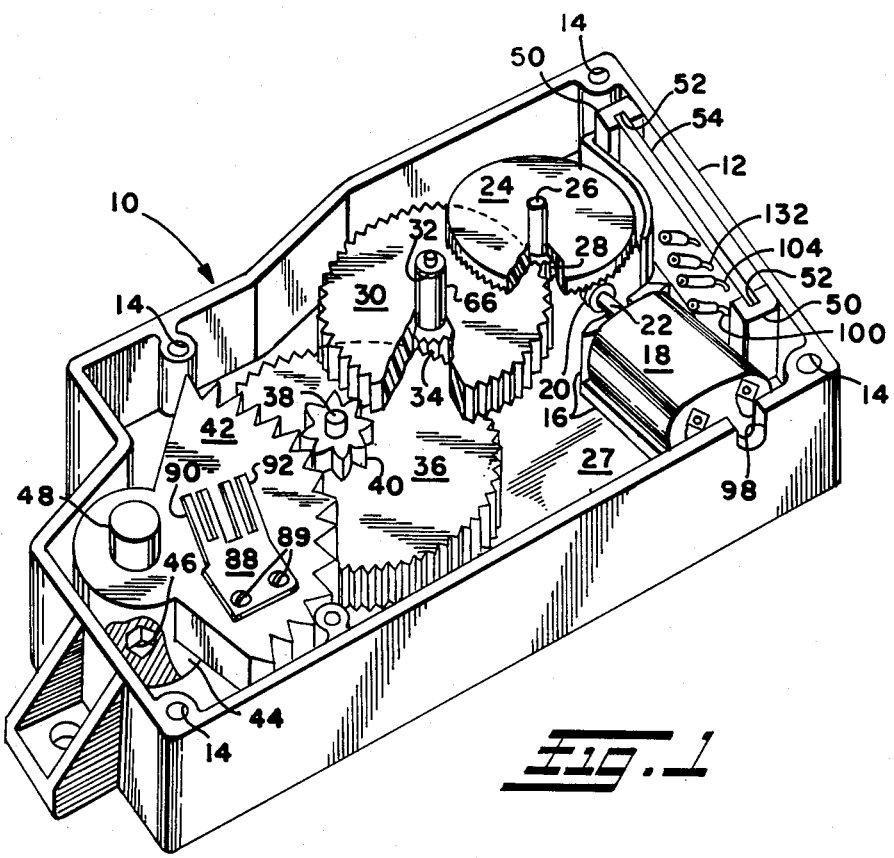
FIG. 1 is a perspective view of the servoactuator with the cover plate raised to show the feedback potentiometer and gear train.

Referring now to FIG. 1, the servoactuator assembly indicated generally at 10 has a hollow case 12 having a generally walled box configuration with a plurality of holes 14 provided therein for attachment of a cover thereto. The case 12 has provided in the hollow thereof a mounting lug 16 having received therein a drive motor 18 with a tapered pinion gear 20 attached to the motor shaft 22. Case 12 is preferably formed of a suitable polycarbonate plastic material as will be hereinafter described.

In the presently preferred practice, motor 18 comprises a small fractional horsepower direct current motor capable of operating on 12 volts D.C. and having a no load shaft speed of about 2500 RPM at 12 volts D.C. or about 3500 RPM no load at 14 volts D.C. A motor requiring a no-load current of 55 milliamperes at 12 volts D.C. and having a stalled rotor current draw of only 160 milliamperes at 12 volts D.C. has been found particularly satisfactory for the present invention when employed for on-board automotive passenger compartment service applications. Such a motor may be driven directly by solid state switching control circuitry thereby enabling sophisticated control logic.

Motor pinion 20 engages, at generally right angles thereto, a beveled-tooth first stage reduction gear 24 which is rotatedly received over a stationary post 26 extending upwardly in cantilever from the bottom 27 of case 12. The beveled gear 24 is a cluster gear and has an integrally formed spur-toothed pinion 28 extending axially therefrom for engagement with the spur-toothed periphery of a secondary reduction gear 30.

In the presently preferred practice of the invention, the beveled motor pinion 20 and primary reduction gear 24 are formed of a suitable thermoplastic material which is more resilient than the plastic material employed for the secondary reduction gear 30. Preferably, the primary beveled reduction cluster gear 24 and beveled motor pinion 20, are formed of thermoplastic elastomeric material preferably having a hardness of 55 durometer on the Shore "D" scale.

The motor gear pinion 20 and integral gear cluster comprising beveled gear 24 and spur toothed pinion 24 are both preferably formed of relatively low modulus thermoplastic elastomer material of the Urethane type in accordance with ASTM-D4000, TPEL000N0180-0CE200GA120JD05JLB400MAS055Vc21, and having a tensile strength per ASTM D638 of 34.5 MPa (5500 psi) at break. One material that has been found satisfactory is that manufactured by E.I. Dupont De Nemoirs & Co.; Wilmington, Del. and having manufacturer's designation "Hytrel 5556".

Second stage reduction cluster gear 30, is pivotably mounted about a post 32 extending upwardly from the bottom 27 of the case; and, the gear 30 is a cluster gear and has an integrally formed spur-toothed driving pinion 34 provided axially thereon which extends downwardly toward the bottom of the case as illustrated in FIG. 1. In the presently preferred practice of the invention, intermediate cluster or second stage gear 30 is formed of (acetal) Polyoxymethylene thermoplastic material per ASTM D1600 and ASTM D4000 POM 00665690 JR120LBO13MA022PA075 having a minimum hardness per ASTM D785 of 120 on the Rockwell "R" scale, a tensile strength per ASTM D638 of 65 MPa (4425 psi) minimum, and an impact resistance per ASTM D256 of 75 Joules/meter (24 ft.-lb./in.) minimum.

Second stage drive pinion 34 engages the spur-toothed periphery of a third stage reduction gear 36 which is pivotally received over a post 38 which extends upwardly from the bottom 27 of case 12. The third stage reduction gear 36 is a cluster gear and has provided thereon a spur-toothed output pinion 40 which extends axially upwardly, as illustrated in FIG. 1, and which engages the spur-toothed periphery of an output sector gear 42.

In the present practice of the invention, third stage gear 36 and its associated integrally formed pinion 40 are formed of a thermoplastic polyester material having a 30% fill of glass fiber material. Preferably, the cluster gear 36 is formed of plastic material having a minimum hardness of 115 on the Rockwell "R" scale. In the presently preferred practice, the cluster gear 36 and its pinion 40 are formed of glass filled polyester thermoplastic material in accordance with ASTM4000 PBTG30G53930JR11OLB002MA008PA085ZZ. One material that has been found satisfactory is that manufactured by E. I. DuPont De Nemoirs & Co., Wilmington, Del. and having manufacturer's designation "Delrin 500".

Output sector gear 42 has a hub 44 which is journaled for rotation in a suitable aperture provided in the bottom 27 of case 12. The lower end of hub 44 has provided therein a polygonally shaped recess 46 adapted for engagement with a shaft (not shown) to be rotated, as, for example, the pivot shaft for an automotive air conditioning system air blend door. Sector gear 42 also has a pilot portion 48 of reduced diameter extending axially from the hub 44 on the end of the hub opposite the end having recess 46. Sector gear 42 is preferably formed of the same material employed for the cluster gear 36.

The above described materials employed for the three clusters, or stages, of the gear train for speed reduction have been found to provide smooth, quiet operation and satisfactory long wear life. However, it has been found necessary, where very long wear life and high output torque are required, to lubricate the first cluster gear or stage 24. In the presently preferred practice, a suitable synthetic hydrocarbon, Lithium soap gelled grease which does not harden above −40° F. has been found particularly satisfactory. One particularly suitable lubricant used is available under the designation "Rheolube 361" from William Nye Co., New Bedford, Mass. 02742. The grease employed should also be suitable as an electrical contact lubricant in the event the rotating gears throw grease on the resistive tracks on the case cover as described hereinafter. It will also be understood that the aforesaid lubricant is employed for lubrication of the gear hubs, in particular the hub of cluster gear 24, which are journalled directly in the material of case 12 and cover 58. Therefore, the lubricant employed must not react with the material used for the gear clusters, case 12 and cover 58. Although variations may be made in particular materials described above, materials having the above described desired properties have been found particularly satisfactory. Furthermore, it will be understood that the interrelation of the parts, in meshing teeth and journalling hubs, requires materials that will not swell and bind due to moisture absorption in high humidity climate service.

A pair of spaced lugs 50 extend inwardly from the sidewall of the case 12 adjacent motor 18 and primary reduction gear 24, with the lugs 50 each having a groove 52 provided therein. A printed circuit board 54 has the opposite ends thereof each slidably received in one of the grooves 52. A curved baffle 56 is formed integrally with the bottom 27 of the case 12 and extends upwardly therefrom for shielding the printed circuit board from the primary reduction gear 24.

Figure 2:
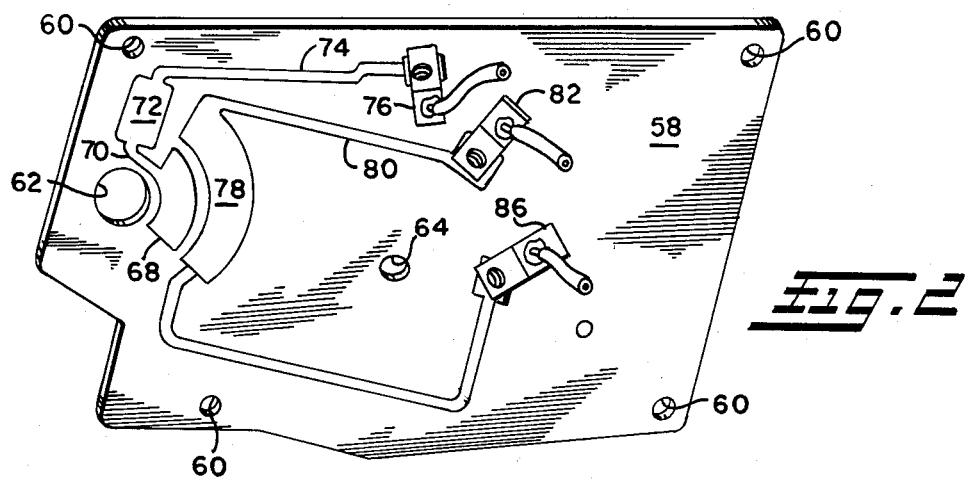
FIG. 2 is a perspective view of the underside of the raised cover plate for the assembly of FIG. 1.

Referring now to FIG. 2, a cover plate is illustrated as having a plurality of apertures provided therethrough which apertures 60 are spaced so as to location-match apertures 14 provided in the case 12 for receiving suitable fastening means (not shown) therethrough for retaining the cover 58 onto the case 12.

Cover plate 58 has an additional aperture 62 provided therein which in the cover-closed position is received over and has sector gear pilot 48 journaled therein for bearing support during rotation of sector gear 42. Another aperture 64 is provided in plate 58 for receiving, in the closed position, the rotating hub 66 of secondary reduction gear 30 in direct journalling engagement.

In the presently preferred practice, the case 12 and cover 58 are formed of thermoplastic material of the polycarbonate type having a hardness, per ASTM D785, of 115-124 on the Rockwell "R" scale and has Izod Impact Strength, per ASTM D256, in the range 80–100 Joules/meter (1.49–1.87 ft.-lb./in.). A material found particularly suitable has ASTM D4000 designation PC210B28940CB145EA170GA12JR115PA080Z. Material in accordance with this designation is available from the General Electric Co., Schenectady, N.Y. under the manufactuers designation "Lexan 500".

Preferably the first stage cluster gear 24 gives a speed reduction of one-sixth (1/6) from motor pinion 20 shaft speed; the secondary cluster gear 30 gives a speed reduction of one-sixth (1/6) of the shaft speed of gear 24; and, third stage cluster gear 36 gives a shaft speed reduction of one-fifth (1/5) from the rate of rotation of gear 30. It will be understood that other gear ratios may be employed, however, the above described ratios have been found particularly satisfactory for quiet running with the high, 3000 RPM, shaft speed for motor pinion 20 and for high output torque with long wear life. In the preferred practice the output sector gear 88 provides a reduction of 11/52 and provides a slew rate of about 21°/sec. for the output shaft drive 46. In one embodiment of the present invention for automotive passenger compartment temperature control system service, with the aforementioned gear ratios and utilizing the above described motor 18, an output torque of 1.92 N-M (17 in.-lb.) at motor stall has been obtained on drive 46 with the desired quiet running operation.

The undersurface of plate 58 has provided thereon an electrically conductive arcuately-shaped strip 68 disposed about aperture 62 and concentric therewith. Strip 68 is connected by means of lead 70 to a strip of electrically resistive material 72 which is connected at its opposite end, via lead 74, to a connecting terminal 76 which in the presently preferred practice is riveted to plate 58. A second arcuately-shaped strip 78 is formed on the surface of plate 58 radially spaced outwardly from strip 68 and similarly concentric with aperture 62. Strip 78 is formed of electrically resistive material and is connected at one end thereof, via lead 80, to connecting terminal 82 which is riveted to plate 58. The opposite end of resistive strip 78 is connected, via lead 84, to a third connecting terminal 86 which is riveted to the cover plate 58.

Referring now again to FIG. 1, a wiper member 88 is attached to sector gear 42 on the upper surface thereof by suitable expedient, as for example, screws 89. The member 88 has a pair of spaced upwardly extending bifurcated arms or fingers 90, 92 which are positioned such that, with cover 58 in the closed position, arm 90 contacts the conductive strip 68 and arm 92 contacts the resistive strip 78. The member 88 is formed of electrically conductive material and thus serves as a moveable shorting bar between the conductive strip 68 and resistive strip 78 for varying the resistance of the connection between terminal 76 and either of the terminals 82, 86 upon rotation of sector gear 42.

In the present practice of the invention, the resistive material of strip 78 and strip 72 is formed of a polymeric material admixed with a carbon powder with the mixture silk screened onto the plate and then baked.

The resistive material 72 and 78 are preferably made by the known technique of spraying finely dispursed carbon onto a plastic strip with an adhesive or bonding agent and then applying the strip to the cover plate 78 and baking the carbon coated plastic onto the plate 58. The conductive strip 74, 80, 84 and arcuate contact strip 68 are formed by depositing silver material onto cover plate 58 prior to the baking operation. The novel construction of the present servoactuator 10 thus employs a structural cover plate which also serves to journal the reduction gear train and as the stationary member for the feedback potentiometer wipers by utilizing resistive material formed integrally with the manufacturing of plate 58.

Figure 3:
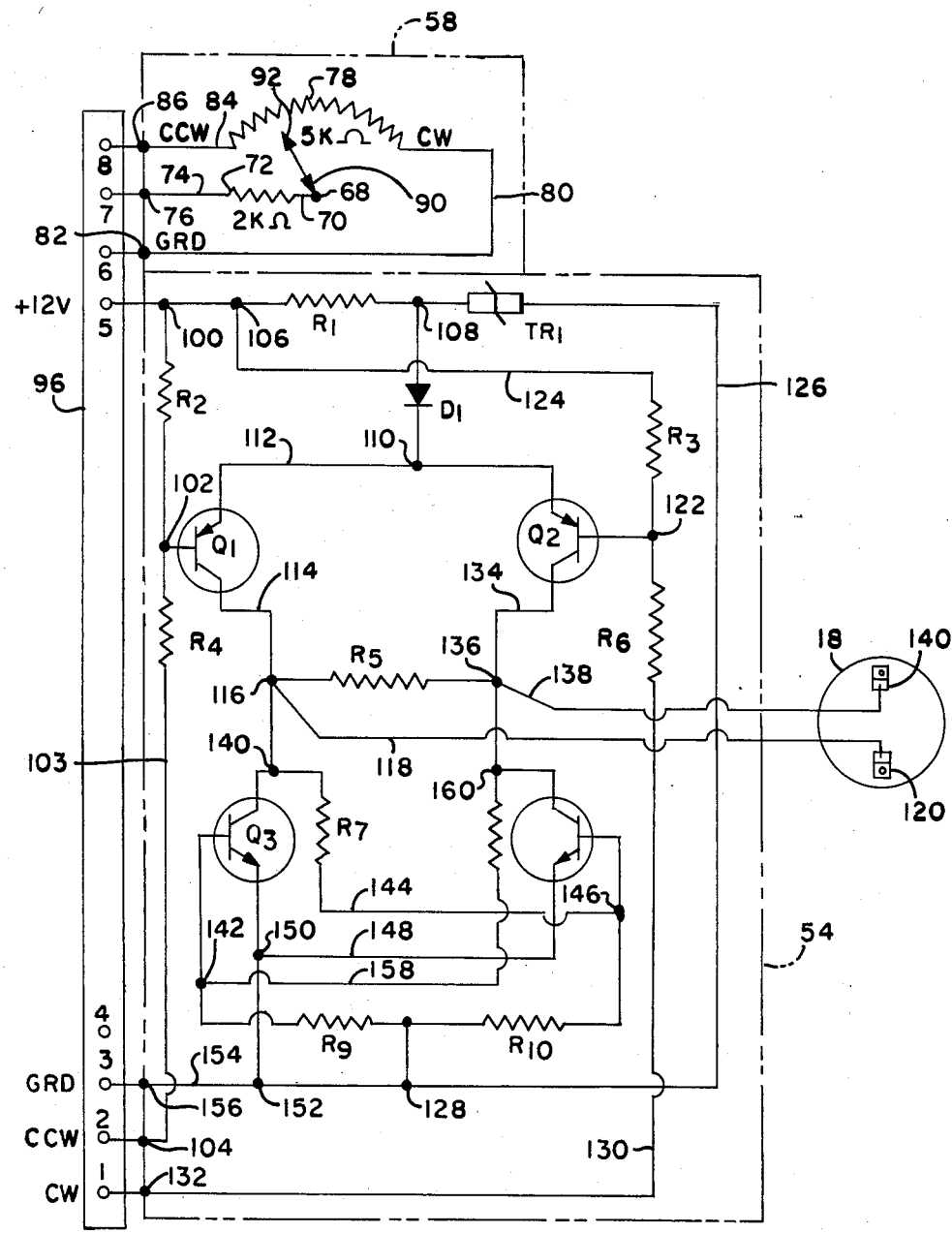
FIG. 3 is an electrical schematic of the potentiometer and motor drive printed circuit board.

Referring now to FIG. 3, the schematic for the circuitry baked on the underside of plate 58 is indicated in dashed outline in the upper portion of the Figure. The schematic for the circuitry provided on printed circuit board 54 is shown in dashed outline in the central portion of FIG. 3. In the schematic for the cover plate 58, it will be noted that the resistive strip 78 has a resistance value of five kilo ohms and the fixed resistive strip 72 has a resistance value of two kilo ohms in the presently preferred practice. The connectors 76, 82, 86 on the cover plate 58 are respectively connected to pins 7, 6 and 8 of an eight-pin connector, denoted 96 in FIG. 3, by suitable electrical lead wires portions of which are shown attached to the connectors in FIG. 2.

With reference to FIG. 2, a cutout 98 is provided in the wall of the case 12 for passage of the lead wires therethrough for connection to the eight pin connector 96, which is not shown in FIGS. 1 and 2 for clarity.

The printed circuit board 54 has a lead from pin 5 of the eight pin connector connected to a terminal 100 which is connected through resistor R2 to the base 102 of switch Q1. Junction 102 is connected through resistor R4 to connector terminal 104 on the printed circuit board, which is connected by an electrical lead to pin 2 of the eight pin connector 96. Junction 100 is connected through junction 106 through resistor R1 through junction 108, through diode D1 in a forward biasing manner to junction 110 and through lead 112 to the emitter of Q1.

The collector of Q1 is connected through lead 114 to junction 116, which is also connected to resistor R5 and through lead 118 to one terminal 120 of motor 18. Junction 110 is also connected to the emitter of switch Q2; and, the base thereof is connected to junction 122 which is also connected through resistor R3 and lead 124 to junction 106.

Junction 108 is connected through transient surpressor TR1 and through lead 126 to junction 128. Junction 122 is connected through resistor R6 and lead 130 to connector terminal 132 on the printed circuit board, which is connected to pin 1 of the eight pin connected 96 by means of a lead (not shown) passing through aperture 98 in the case.

Switch Q2 has its collector connected via lead 134 to junction 136, which is connected to resistor R5 and also through lead 138 to the opposite connector 140 of motor 18.

Junction 116 is also connected to junction 140, which is connected to the collector of switch Q3 which has its base connected to junction 142. Junction 140 is connected through resistor R7 and lead 144 to junction 146, which is also connected to the base of a switch Q4, which has its emitter connected through lead 148 to junction 150. Junction 150 is connected to the emitter of Q3 and also to junction 152 and through lead 154 to connector terminal 156 on the printed circuit board, which is connected to system ground through pin 3 of the eight pin connector 96.

Junction 142 is connected through lead 158 to resistor R8 and junction 160. Junction 160 is connected to junction 136 and also to the collector of switch Q4. Junction 146 is connected through resistor R10 to junction 162 which is connected through resistor R9 to junction 142.

In operation, junction 100 is connected through pin 5 of the eight pin connector 96 to a positive 12 volt source of power; and, the system ground is connected through pin 3 of the eight pin connector 96 to junction 156. Junction 86 is connected through pin 8 of connector 96 to the Wheatstone bridge circuit (not shown) or comparator network (not shown) for providing a feedback signal in the form of increasing resistance indicating counter clockwise rotation of the sector gear 42. Junction 76 of the printed circuit board is connected through pin 7 of the eight pin connector 96 to the Wheatstone bridge circuit (not shown) input or the comparator network input (not shown) for detecting a feedback signal comprising decreasing resistance with increasing clockwise rotation of the sector or gear 42. Connector 82 of the cover plate is connected through pin 6 of the eight pin 96 to the system ground.

In the present practice of the invention, the circuit resistances are chosen in accordance with the following table.

| Element | Ohms |
| --- | --- |
| R1 | 10 |
| R2, R3 | 10K |
| R4, R6 | 2.2K |
| R5 | 560 |
| R7, R8 | 2.2K |
| R9, R10 | 10K |

In operation, when a signal is received through pin 1 of connector 96 to connector terminal 132 for energizing the motor and for clockwise rotation of sector 42, the voltage through junction 122 to the base of switch Q2 causes Q2 to turn "ON" thereby simultaneously applying a voltage through junction 136 to resistor R5 and terminal 140 of the motor. The voltage applied through R5 causes a voltage at junction 140 on the collector of switch Q3 which is turned "ON" thereby conducting current through junction 150 and 152 to ground, thereby permitting current to flow through the motor for rotation.

When wiper arm 92 rotates to cause a predetermined value of resistance on resistive strip 78, the feedback resistance is sent through terminals 6, 7 and 8 of the eight pin connector 96; and, the signal to pin 1 is terminated when the sector gear 42 has reached the desired position and Q2 is switched "OFF" thereby de-energizing motor 18.

Similarly, when a signal is applied through pin connector 96 and printed circuit board connector junction 104, a voltage is applied through R4 in junction 102 to the emitter switch Q1 which turns "ON" applying a voltage through lead 114 to the junction 116 and the opposite terminal 120 of motor 18 and through resistor R5 to junction 136 and junction 160 to the collector of Q4 thereby switching Q4 "ON" causing current to flow through the emitter and lead 148 through junction 150 to ground thereby causing motor current to flow in a diverse direction resulting in counter clockwise rotation of sector gear 42. When the sector gear has rotated to the desired postion, the resistance sent through terminals 6, 7 and 8 of the 96 pin connector for resistive strip 78 result in termination of the signal to junction 140 which switches Q1 "OFF" thereby de-energizing the motor 18.

The present invention thus provides a reliable, simply constructed shaft position-seeking servoactuator which is low in manufacturing cost, quiet running and has a long wear life. The servoactuator of the present invention employs a very low power subfractional horsepower 12 V dc motor and yet provides a relatively high torque output and slew rate suitable for one-board automotive passenger compartment temperature control system precision blend-door movement. The present servo, by virtue of its simplicity and ruggedness readily lends itself to high volume production for automotive passenger car production installation. The unique arrangement of the non-metallic speed reduction gearing, and the three stages of reduction with different materials for the cluster gears in each stage, provides particularly quiet running and long gear life.

Although the invention has hereinabove been described with respect to the illustrated embodiments, it will be understood by those skilled in the art that the invention is capable of modification and variation and is limited only by the following claims.

We claim:

1. A servoactuator having an output shaft rotated by a motor in response to an electrical signal, said servoactuator comprising:
   (a) housing means including a shell member and a cover therefor, with said motor mounted in said shell;
   (b) speed reducing means disposed in said shell and connecting said motor with said output shaft, said speed reducing means including,
      (i) a first stage cluster gear and motor pinion formed of relatively soft low modulus thermoplastic urethane elastomer;
      (ii) a second stage cluster gear driven by said first stage and formed of non-metallic material having a minimum hardness of 120 as measured on the Rockwell "R" scale;
      (iii) a third stage cluster gear driven by said second stage and formed of thermoplastic polyester material having about thirty percent (30%) glass fiber fill;
   (c) variable resistor means including a resistive strip formed integrally on the inner surface of said cover plate and wiper means moveable with said speed reducer means for wiping said resistor means, said resistor means comprising at least one arcuate strip of polymeric material admixed with a material of predetermined electrical resistivity;
   (d) electrical connector means connected to said resistor means and adapted for external electrical lead connection thereto, said connector means being series connected with said electrical contacts to provide a predetermined variable electrical resistance in said circuit with variable positions of said output shaft; and,
   (e) means securing said cover plate over said shell.

2. The servoactuator defined in claim 1, wherein said motor pinion and said first stage cluster gear are formed of material having a hardness of 55 durometer on the Shore "D" scale.

3. The servoactuator defined in claim 1, wherein said second stage cluster gear is formed of acetal resin material having an impact resistance of 75 Joules/meter as measured by the Izod Method A tehcnique.

4. The servoactuator defined in claim 1, wherein said third stage cluster gear is formed of material having a minimum hardness of 115 as measured on the Rockwell "R" scale.

5. The servoactuator defined in claim 1, wherein said third stage cluster gear is formed of Polyester resin material having a hardness of 118 as measured on the Rockwell "R" scale.

6. The servoactuator defined in claim 1, wherein said first stage cluster gear is lubricated with synthetic hydrocarbon lithium soap gelled grease.

7. The servoactuator defined in claim 1, further comprising fixed resistance means series connected with said variable resistance means, said fixed resistance comprisin a strip formed integrally with said cover.

8. The servoactuator defined in claim 1, wherein said first stage cluster gear and said motor pinion have bevelled gear teeth and orthogonal axes of rotation and the remaining stages comprise spur toothed gears.

9. A position seeking servoactuator having a rotating output shaft and a drive motor operative in response to an electrical position signal, said servo comprising:
   (a) housing means including a shell member and a cover therefor formed of non-metallic material having a hardness of at least 115 on the Rockwell "R" scale with said motor received in said shell;
   (b) speed reducing means disposed in said shell and connecting said drive motor to said output shaft, said speed reducing means including,
      (i) first stage gearing having a beveled pinion on said motor and a beveled reduction gear in driving contact with said pinion, said first stage gearing formed of thermoplastic elastomer having a hardness of 55 durometer as measured on the Shore "D" scale;
      (ii) second stage gearing driven by said first stage, including a spur toothed gear, formed of non-metallic material havng a minimum hardness of 120 as measured on the Rockwell "R" scale,
      (iii) third stage gearing driven by said second stage and including a spur toothed gear formed of non-metallic material having a minimum hardness of 115 as measured on the Rockwell "R" scale;
   (c) variable resistor means including a resistive strip formed integrally on the inner surface of said cover plate and wiper means moveable with said output shaft for wiping said resistor means for providing an output shaft position feedback signal;
   (d) electrical connector means connected to said variable resistance means and adapted for external electrical lead connection thereto; and,
   (e) means securing said cover to said shell, wherein said first, second and third stage reduction gears are journalled directly in contact with the material of said shell.

10. The servoactuator defined in claim 9, wherein said shell and cover are made of polycarbonate plastic material.

11. The servoactuator defined in claim 9, wherein said first stage beveled gears are formed of urethane elastomer material, said second stage gear is formed of polyoxymethylene material, and said third stage gear is formed of thermoplastic polyester material having a 30% glass fiber fill.

12. The servoactuator defined in claim 9, further comprising lubricant for at least said first stage gearing, said lubricant comprising synthetic hydrocarbon lithium soap gelled grease non-hardening at 40° F.

13. The servoactuator defined in claim 9, wherein said thermoplastic material for said first stage gearing comprises urethane material having a tensile strength of 5500 psi (34.5 MPa) at break and said second stage gearing material has a tensile strength of 65 MPa (9425 psi) mininum.

14. The servoactuator defined in claim 9, wherein said output shaft has the shaft speed thereof reduced by a ratio of at least one to eight hundred (1/800) as compared to the motor shaft speed.

15. The servoactuator defined in claim 9, wherein said first stage of gearing yields a one-to-six (1/6) speed reduction.

16. The servoactuator defined in claim 9, wherein said second stage of gearing yields a speed reduction of one-to-six (1/6).

17. The servoactuator defined in claim 9, wherein said third stage gearing yields a one-to-five (1/5) speed reduction.

18. A position seeking servoactuator having a rotating output shaft and a drive motor operative in response to an electrical position signal, said servoactuator comprising:
 (a) housing means including a shell member and a cover therefore formed of non-metallic electrically insulating material;
 (b) speed reducing means disposed in said shell and connecting said drive motor to said output shaft, said speed reducing means including;
  (i) first stage gearing having a pinion on said motor and a reduction gear in contact with said pinion, said first stage gearing formed of relatively soft low modulus thermoplastic urethane elastomer, said first stage gearing yielding a speed reduction of at least one-sixth (1/6) from said motor pinion;
  (ii) second stage gearing driven by said first stage including a spur-toothed gear formed of non-metallic material having a minimum hardness of 120 as measured on the Rockwell "R" scale, said second stage gearing yielding a speed reduction of at least one-sixth (1/6) from said first stage reduction gear;
  (iii) third stage gearing driven by said second stage gearing and formed from non-metallic material having a minimum hardness of 115 as measured on the Rockwell "R" scale;
 (c) variable resistor means including a resistive strip formed integrally on the inner surface of said cover, and wiper means moveable with said output shaft for wiping said resistor means;
 (d) circuit means connected to said variable resistance means operable for providing an output shaft position feedback signal;
 (e) said motor having a no-load shaft speed of at least 2500 rpm at 12 volts d.c. excitation and said speed reducing means output shaft having an overall speed reduction of at least one to eight hundred (1/800) as compared to said motor shaft.

* * * * *